(12) United States Patent
Maeng et al.

(10) Patent No.: US 10,936,062 B2
(45) Date of Patent: Mar. 2, 2021

(54) INTELLIGENT DEVICE AND METHOD OF INFORMATION DISPLAYING WITH PROJECTION TYPE USING THE SAME

(71) Applicant: LG ELECTRONICS INC., Seoul (KR)

(72) Inventors: Jichan Maeng, Seoul (KR); Beomoh Kim, Seoul (KR); Taehyun Kim, Seoul (KR); Wonho Shin, Seoul (KR); Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/573,852

(22) Filed: Sep. 17, 2019

(65) Prior Publication Data

US 2020/0012343 A1 Jan. 9, 2020

(30) Foreign Application Priority Data

Aug. 30, 2019 (KR) ........................ 10-2019-0107769

(51) Int. Cl.
*G06F 3/01* (2006.01)
*G06K 9/00* (2006.01)
*G06N 20/00* (2019.01)
*G06T 7/13* (2017.01)
*H04L 12/28* (2006.01)
*G06T 7/73* (2017.01)

(52) U.S. Cl.
CPC .......... *G06F 3/013* (2013.01); *G06K 9/00369* (2013.01); *G06N 20/00* (2019.01); *G06T 7/13* (2017.01); *G06T 7/73* (2017.01); *H04L 12/282* (2013.01); *H04L 12/2838* (2013.01); *H04L 2012/2841* (2013.01); *H04L 2012/2849* (2013.01)

(58) Field of Classification Search
CPC .. G06K 9/00369; G06K 9/6273; G06F 3/013; H04L 12/2838; H04L 2012/2841; H04L 2012/2849; H04L 12/282; G06N 3/084; G06N 20/00; G06T 7/44; G06T 7/13; G06T 7/73; G06T 2207/20081; G06T 2207/30201; G06T 2207/20084; G06T 2200/04; G06T 2207/10028
See application file for complete search history.

(56) References Cited

U.S. PATENT DOCUMENTS 10,535,199 B1 * 1/2020 Bond ................... G06T 17/00
2013/0101206 A1 * 4/2013 Dedeoglu ............... G06T 7/11
382/154

(Continued)

*Primary Examiner* — Muhammad N Edun
(74) *Attorney, Agent, or Firm* — Birch, Stewart, Kolasch & Birch, LLP

(57) ABSTRACT

According to the present invention, a method of displaying status information for a device to a user comprises receiving a control command for controlling the device to display the status information, determining the user's location, selecting other areas than where the user is located as mapping candidate areas, and selecting at least any one or more of the mapping candidate areas as a mapping area and displaying the status information in the mapping area in a projection fashion. Embodiments of the present invention may be related to artificial intelligence (AI) modules, unmanned aerial vehicles (UAVs), robots, augmented reality (AR) devices, virtual reality (VR) devices, and 5G service-related devices.

18 Claims, 16 Drawing Sheets

(56) References Cited

U.S. PATENT DOCUMENTS

2018/0329617 A1* 11/2018 Jones ...................... H04L 67/12
2019/0122174 A1*  4/2019 Gil ........................ H04W 4/021
2020/0018962 A1*  1/2020 Lu ...................... G02B 27/0093

* cited by examiner

[Figure 1]
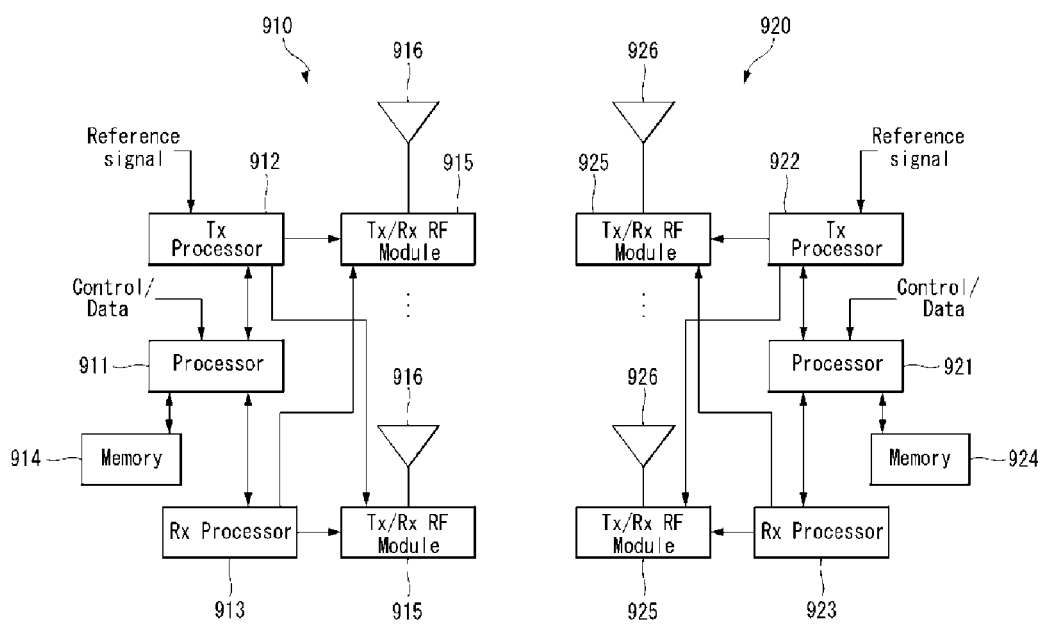

[Figure 2]
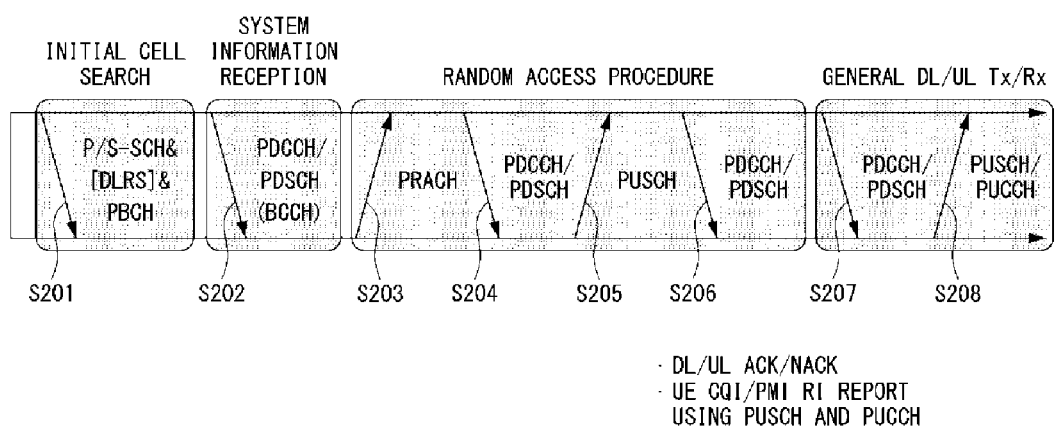
- DL/UL ACK/NACK
- UE CQI/PMI RI REPORT USING PUSCH AND PUCCH

[Figure 3]
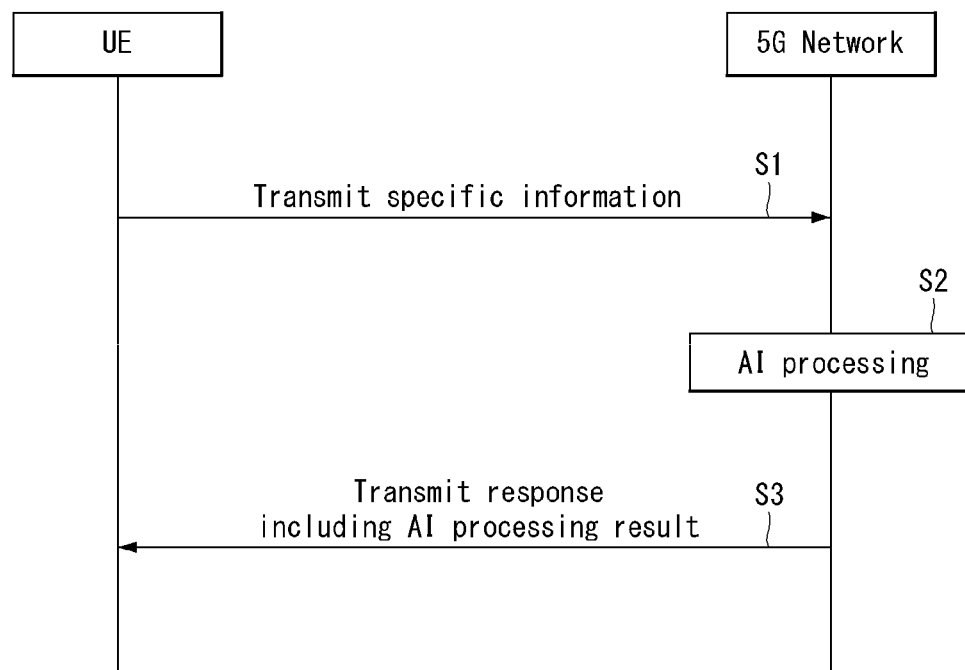

[Figure 4]
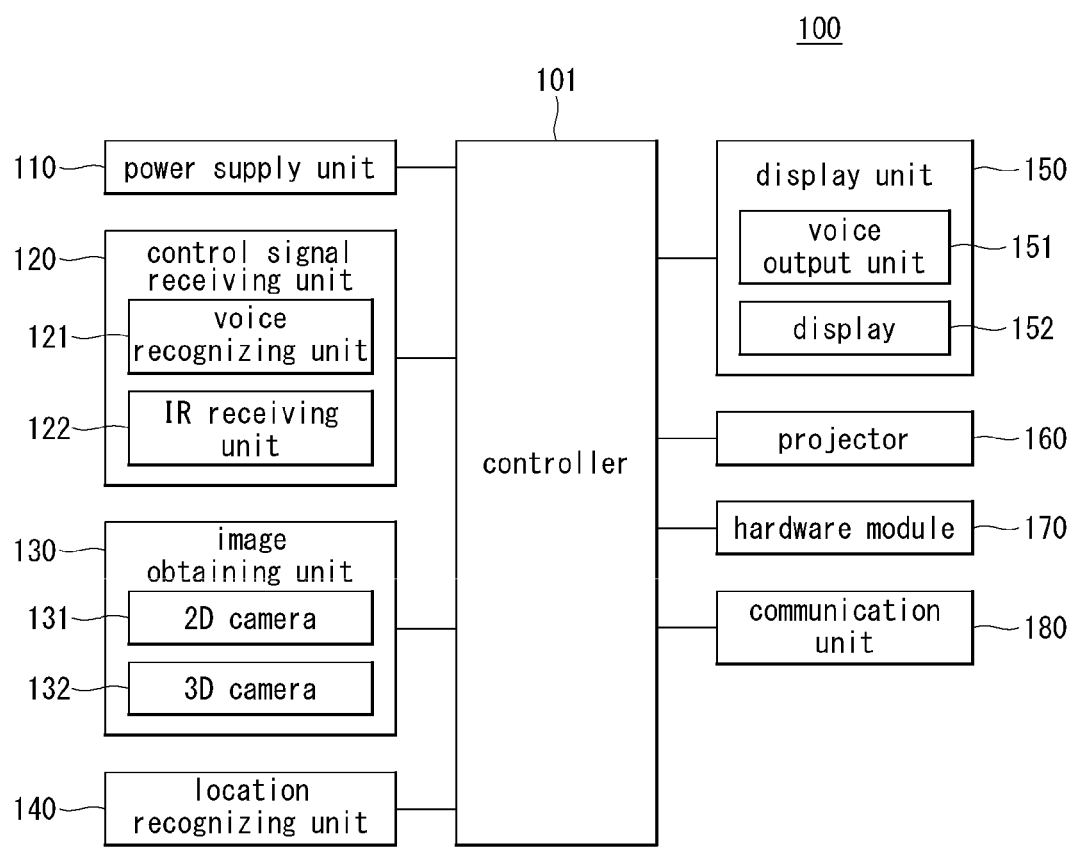

[Figure 5]
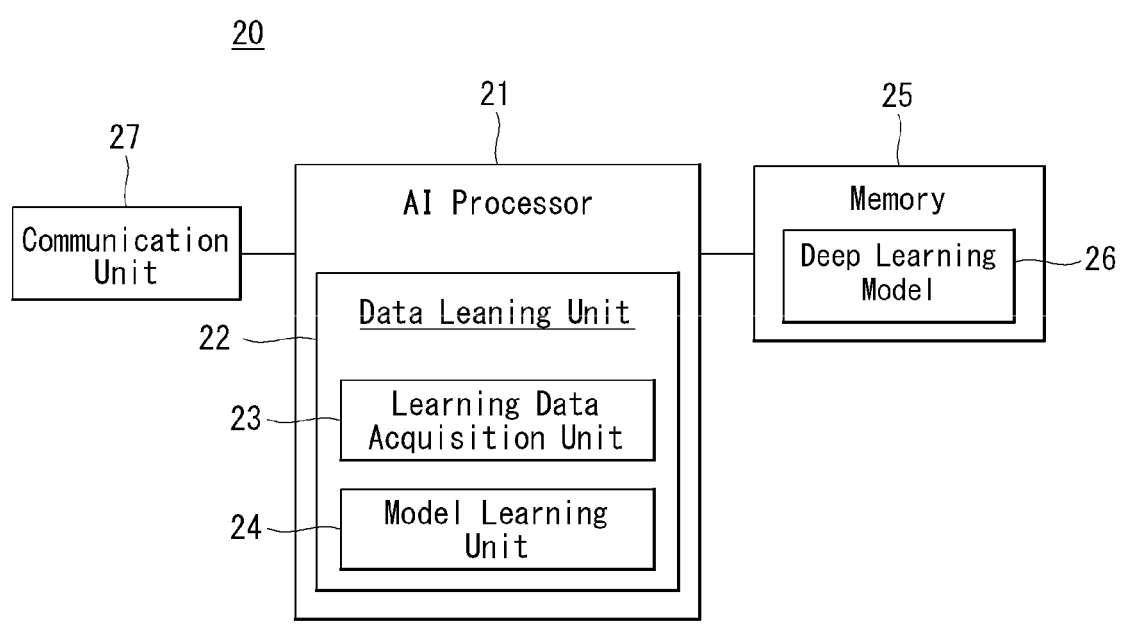

[Figure 6]
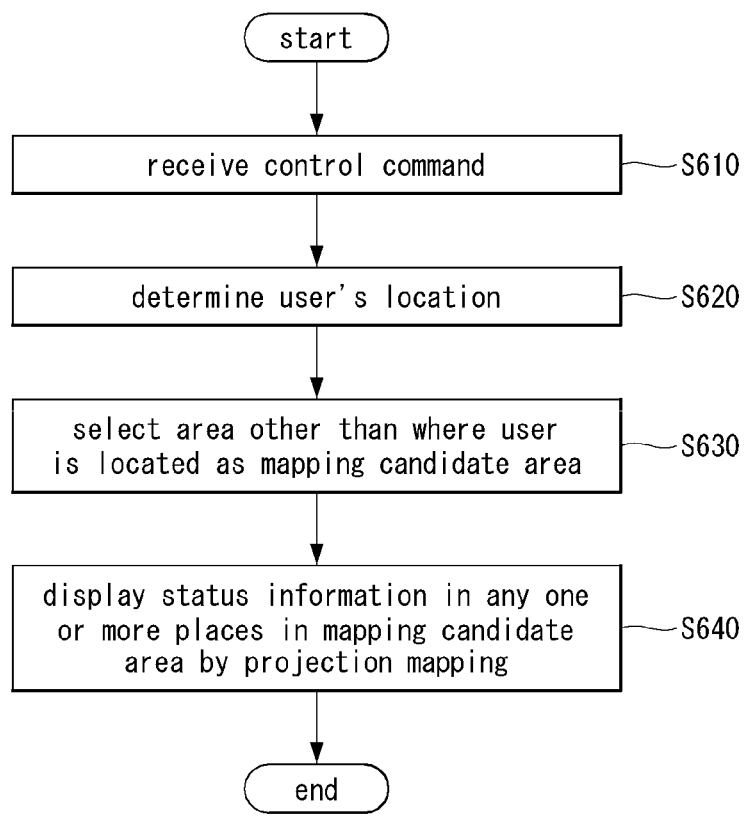

[Figure 7]
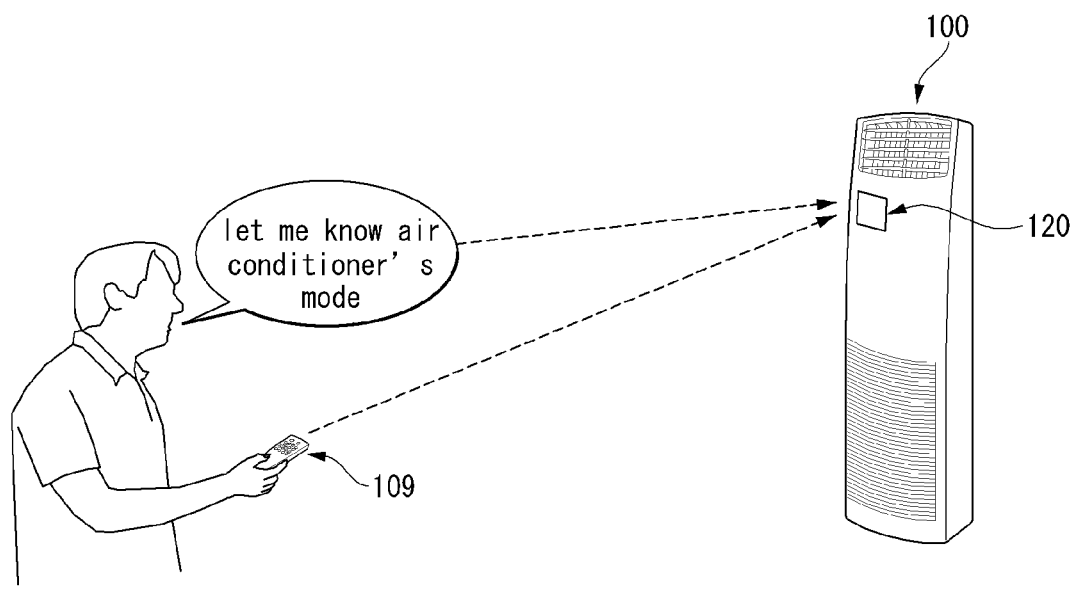

[Figure 8]
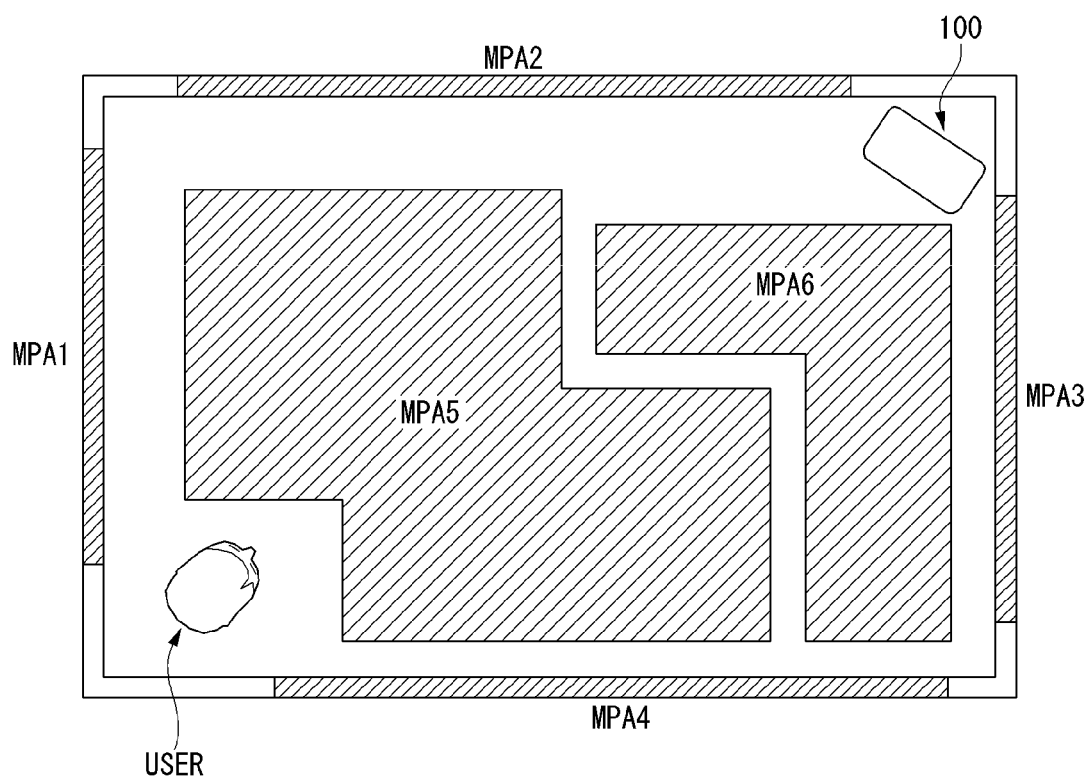

[Figure 9]
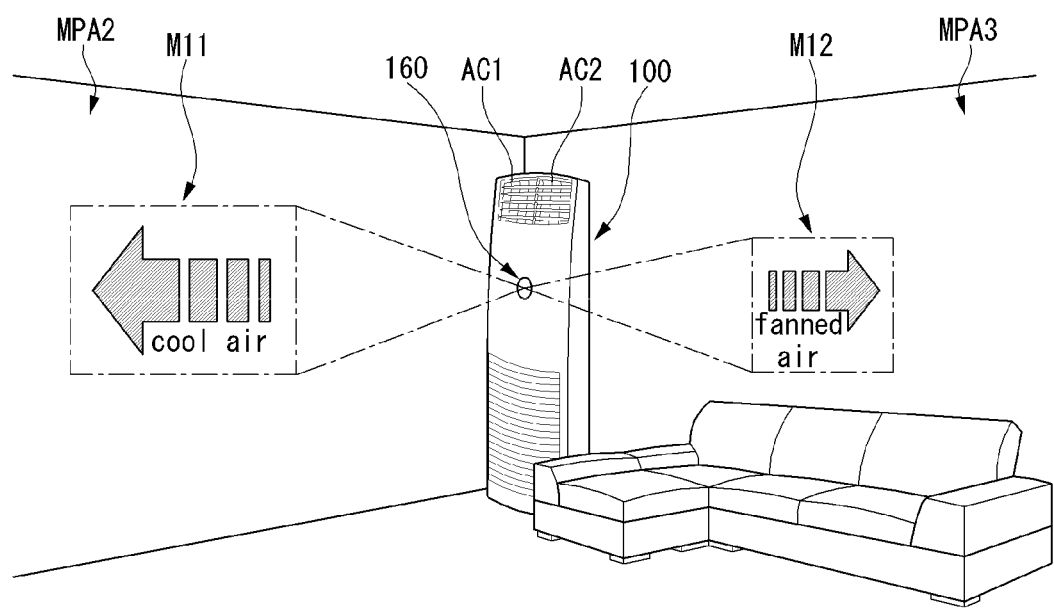

[Figure 10]
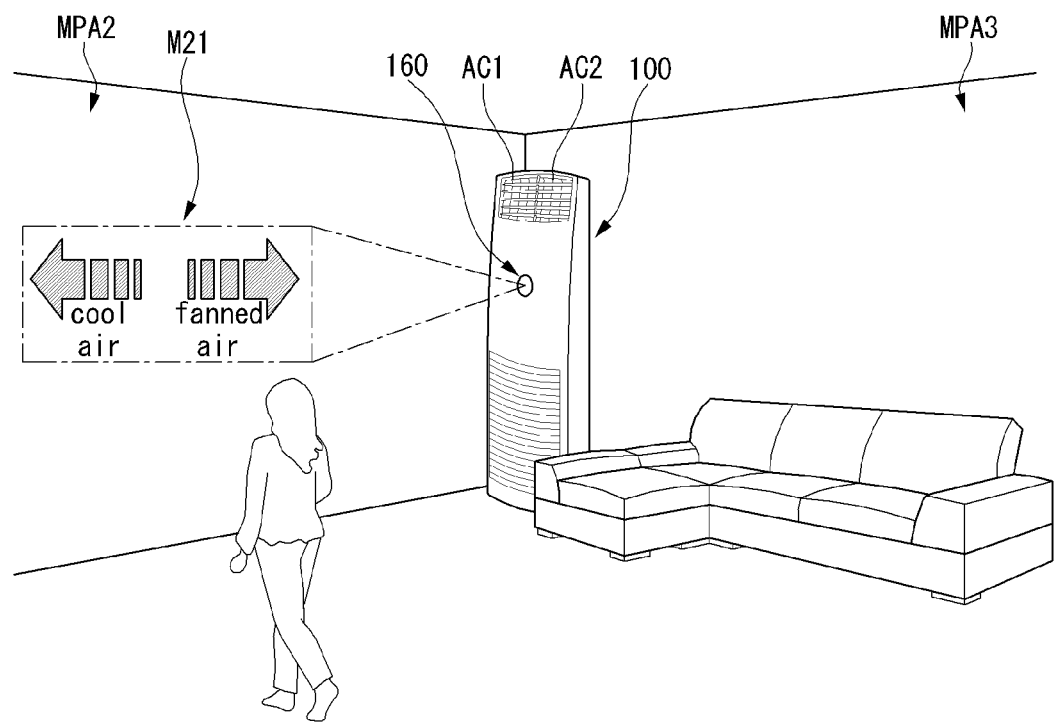

[Figure 11]
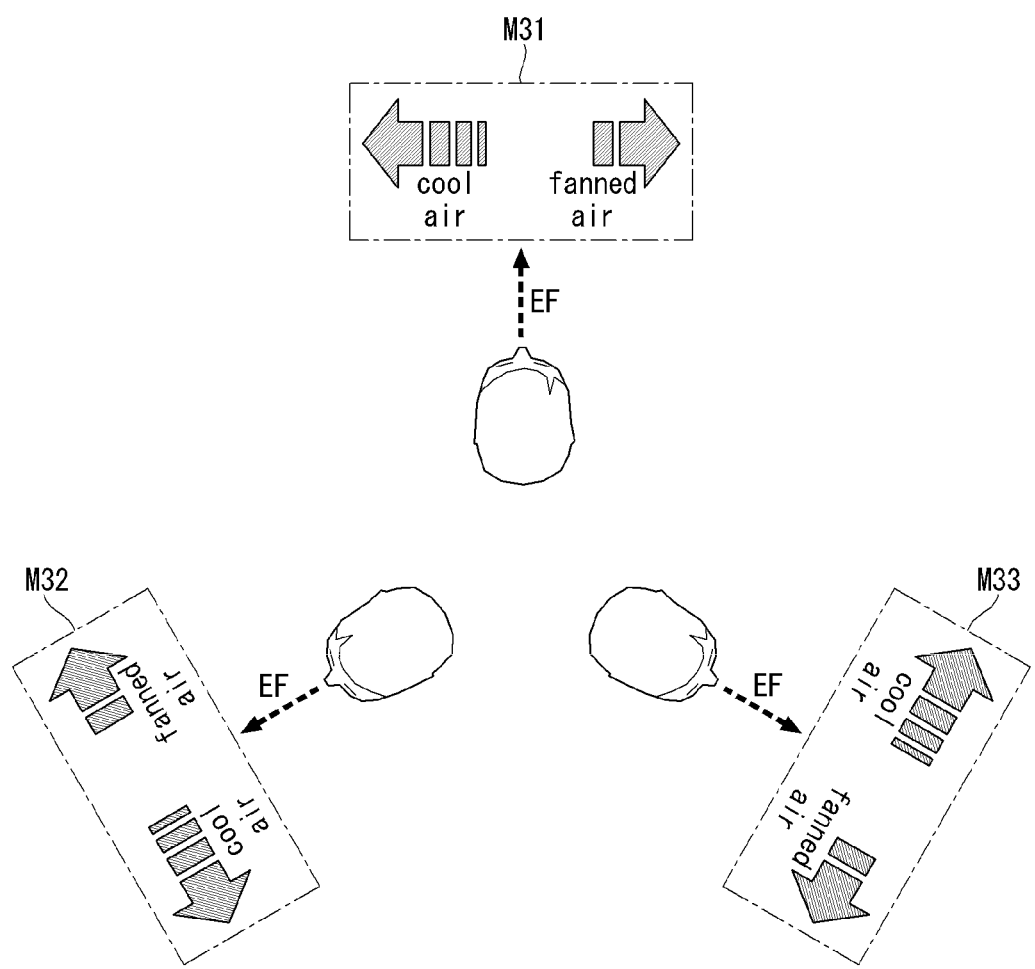

[Figure 12]
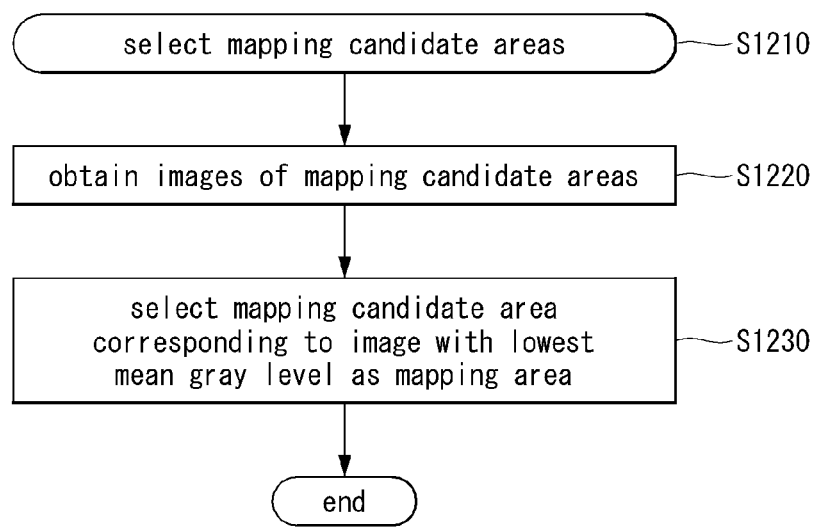

[Figure 13]
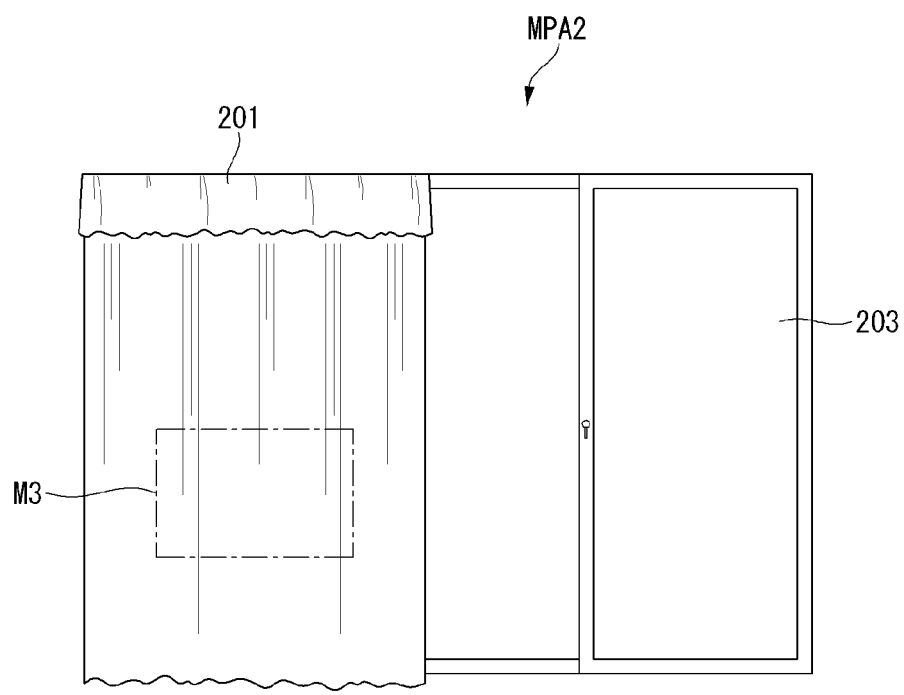

[Figure 14]
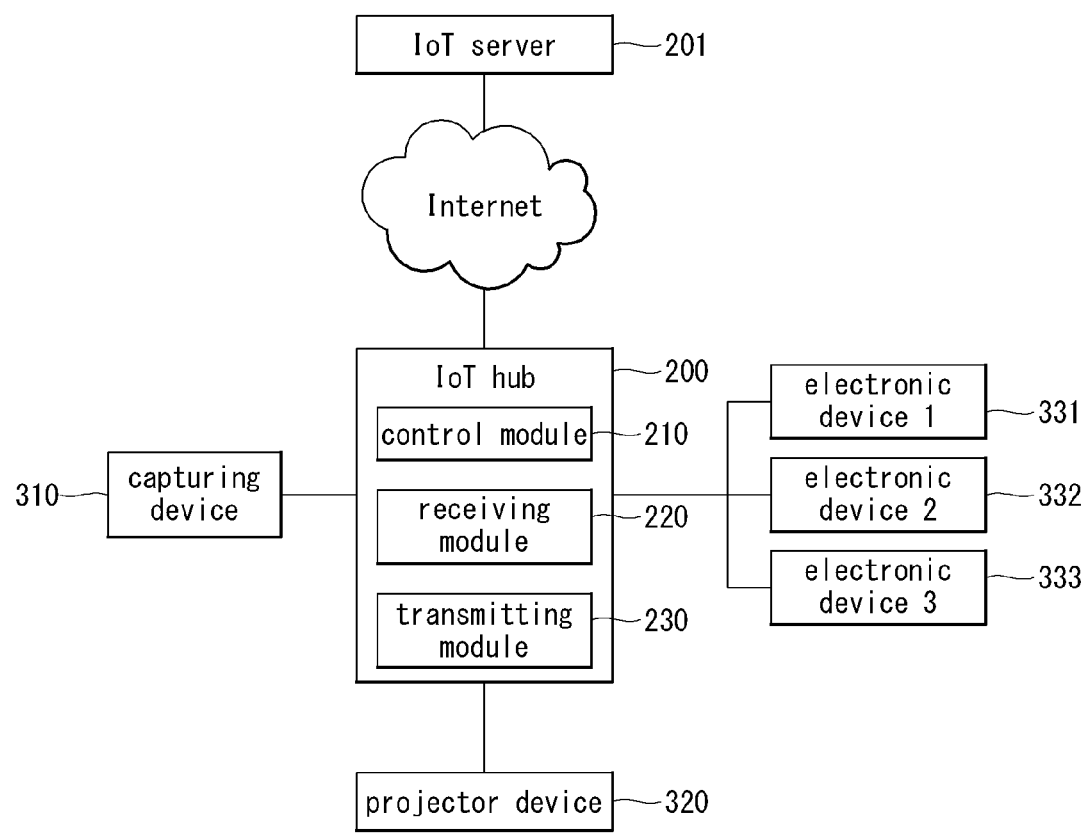

[Figure 15]
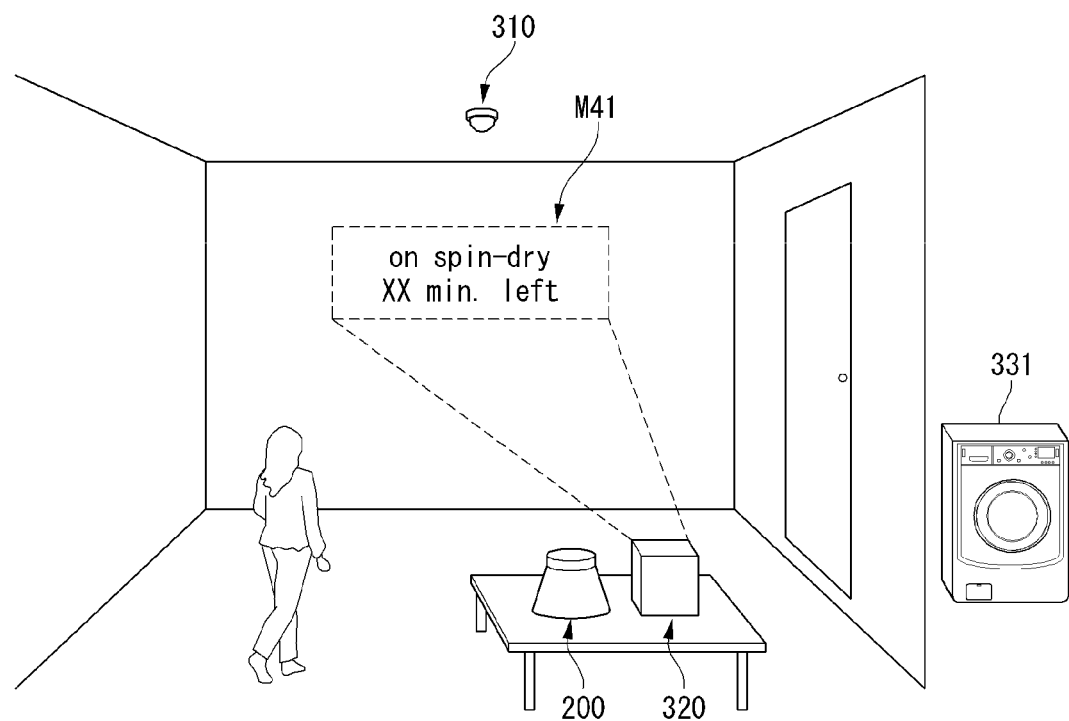

[Figure 16]
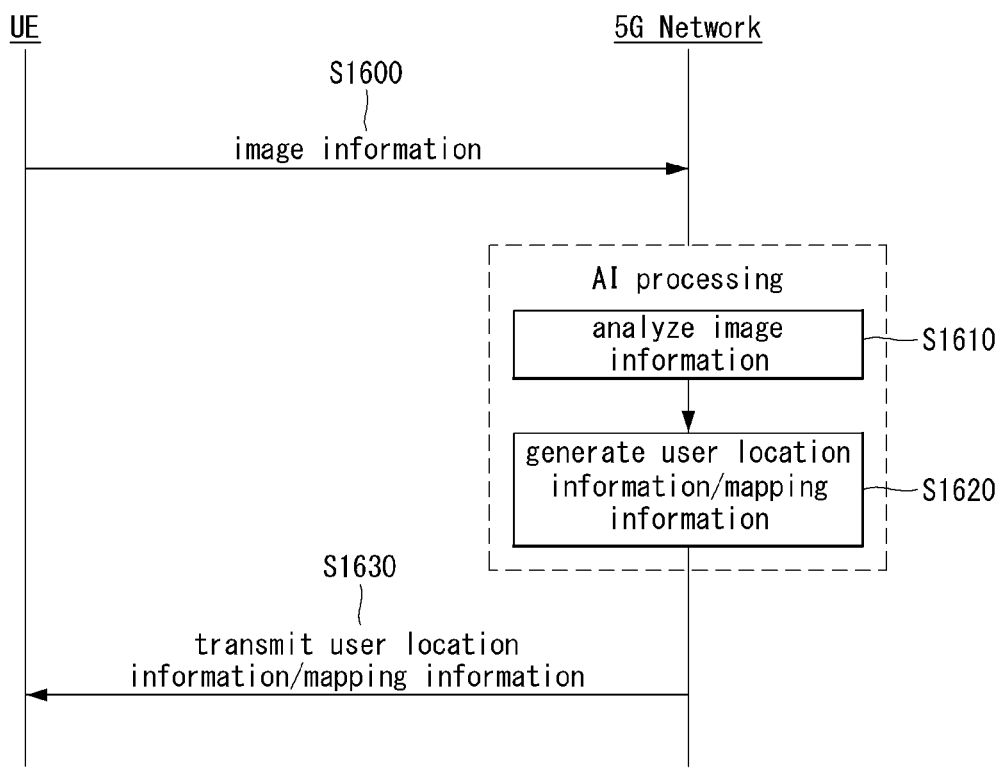

INTELLIGENT DEVICE AND METHOD OF INFORMATION DISPLAYING WITH PROJECTION TYPE USING THE SAME

CROSS-REFERENCE TO RELATED APPLICATION(S)

This application is based on and claims priority under 35 U.S.C. 119 to Korean Patent Application No. 10-2019-0107769, filed on Aug. 30, 2019, in the Korean Intellectual Property Office, the disclosure of which is herein incorporated by reference in its entirety.

TECHNICAL FIELD

The present invention relates to an intelligent device and a method of displaying information in a projection fashion using the same, and more specifically, to an intelligent device, which allows the user to identify the operation state of electronic devices in an easy and intuitive manner, and a method of displaying information in a projection fashion using the same.

DISCUSSION OF RELATED ART

Besides their unique functions, electronic devices add extra functions for user convenience purposes. As a representative example, electronic devices have a display capable of displaying their operation state. Showing users the operation state of electronic devices may aid them in controlling the electronic devices.

As the display is disposed to be exposed from the electronic device, the user is required to approach the electronic device for checking the operation state.

The display of an electronic device typically indicates the operation state via simple text or images but may not do so in an intuitive manner due to limitations in its position and size.

SUMMARY

The present invention aims to address the foregoing issues and/or needs.

According to the present invention, there is provided a device that allows the user to easily identify the status information for the electronic device even without the need for approaching the electronic device.

According to the present invention, there is provided a device capable of displaying status information in a more intuitive manner.

According to an embodiment of the present invention, a method of displaying information in a projection fashion using an intelligent device comprises receiving a control command for controlling the device to display the status information, determining the user's location, selecting other areas than where the user is located as mapping candidate areas, and selecting at least any one or more of the mapping candidate areas as a mapping area and displaying the status information in the mapping area in a projection fashion.

Determining the user's location may include analyzing a waveform radiated from a lidar and reflected by the user.

Determining the user's location may include obtaining an image for an ambient area of the device, detecting objects from the image, and detecting a user object corresponding to the user from the objects based on artificial intelligence (AI) learning.

Selecting the mapping area may include identifying an area, to which the user's gaze is directed, from the image and setting the area, to which the user's gaze is directed, as the mapping area.

Identifying the area to which the user's gaze is directed may include performing eye-tracking in the image.

When a floor surface which is lower than the user's gaze is selected as the mapping area, displaying the status information may include rotating the mapping area according to the user's gaze direction.

Selecting the mapping area may include obtaining images of the mapping candidate areas and selecting the mapping area from among the mapping candidate areas based on a gray level distribution of the images of the mapping candidate areas.

Selecting the mapping area may include selecting a mapping candidate area, which corresponds to an image with a lowest mean gray level among the images of the mapping candidate areas, as the mapping area.

Selecting the mapping area may include selecting a mapping candidate area, which corresponds to an image with a lowest edge detection frequency among the images of the mapping candidate areas, as the mapping area.

Determining the user's location or selecting the mapping area may further include receiving, from a network, downlink control information (DCI) used for scheduling transmission of information for the image for the ambient area. The information for the image for the ambient area may be transmitted to the network based on the DCI.

Determining the user's location or selecting the mapping area may further include performing an initial access procedure with the network based on a synchronization signal block (SSB). The information for the image for the ambient area may be transmitted to the network via a physical uplink shared channel (PUSCH). Demodulation-reference signals (DM-RSs) of the SSB and the PUSCH may be quasi co-located (QCL) for QCL type D.

According to an embodiment of the present invention, an intelligent device comprises a control signal receiving unit receiving a control command for controlling a device to display status information, an image obtaining unit obtaining an ambient image of the device, and a controller determining a user's location in response to the control command, selecting areas other than where the user is located as mapping candidate areas, selecting at least one of the mapping candidate areas as a mapping area, and controlling the device to display the status information in the mapping area in a projection fashion.

The controller may determine the user's location by detecting objects from the ambient image and detecting an object corresponding to the user among the objects.

The controller may identify an area to which the user's gaze is directed in the ambient image and sets the area, to which the user's gaze is directed, as the mapping area.

The controller may rotate the mapping area according to the user's gaze direction when a floor surface, which is lower than the user's gaze, is selected as the mapping area.

The controller may obtain images of the mapping candidate areas and select a mapping candidate area, which corresponds to an image with a lowest mean gray level among the images of the mapping candidate areas, as the mapping area.

According to various embodiments of the present invention, an intelligent device controlling a projector device to display status information for an external device comprises a receiving module receiving a control command for controlling the intelligent device to display the status information for the external device, receiving an ambient image obtained by at least one capturing device, and receiving the status information from the external device, a control module generating a control signal for determining a user's location in response to the control command, selecting areas other than where the user is located as mapping candidate areas, selecting at least one of the mapping candidate areas as a mapping area, and controlling the projector device to display the status information in the mapping area in a projection fashion, and a transmitting module transmitting the control signal to the projector device.

The control module may determine the user's location by detecting objects from the ambient image and detecting an object corresponding to the user among the objects.

The control module may identify an area to which the user's gaze is directed in the ambient image and sets the area, to which the user's gaze is directed, as the mapping area.

The control module may rotate the mapping area according to the user's gaze direction when a floor surface, which is lower than the user's gaze, is selected as the mapping area.

The control module may obtain images of the mapping candidate areas and select a mapping candidate area, which corresponds to an image with a lowest mean gray level among the images of the mapping candidate areas, as the mapping area.

Embodiments of the present invention may provide the following effects.

According to the present invention, the device displays status information in a projection fashion. Thus, the device may display status information intuitively and with limited limitations on display space.

According to the present invention, the intelligent device may display status information for external devices by way of a separate projector device. Thus, the intelligent device may display status information for external devices without the need for approaching the external devices.

BRIEF DESCRIPTION OF THE DRAWINGS

FIG. 1 is a block diagram illustrating a wireless communication system to which methods proposed herein may apply;

FIG. 2 is a view illustrating an example signal transmission/reception method in a wireless communication system;

FIG. 3 is a view illustrating basic example operations of a user terminal and a 5G network in a 5G communication system;

FIG. 4 is a block diagram illustrating a configuration of an intelligent device according to an embodiment of the present invention FIG. 5 is a block diagram illustrating an AI device according to an embodiment of the present invention;

FIG. 6 is a flowchart illustrating a method of displaying status information according to an embodiment of the present invention;

FIG. 7 is a view illustrating a method of transferring a control command;

FIG. 8 is a view illustrating a method of obtaining mapping candidate areas;

FIG. 9 is a view illustrating an embodiment of displaying status information in a projection mapping scheme;

FIG. 10 is a view illustrating a method of setting a mapping area according to another embodiment;

FIG. 11 is a view illustrating a method of displaying a projection mapping image according to a user's gaze;

FIG. 12 is a view illustrating a method of setting a mapping area according to still another embodiment;

FIG. 13 is a view illustrating an example method of setting a mapping area;

FIG. 14 is a view illustrating a system of displaying status information for an electronic device according to another embodiment;

FIG. 15 is a view illustrating a method of displaying status information using a system as illustrated in FIG. 14; and FIG. 16 is a view illustrating a method of generating user location information and mapping information according to another embodiment of the present invention.

DETAILED DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of block diagram of UE and 5G network

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle. UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here. QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB. CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size. (2) a relatively low arrival rate, (3) extremely low latency requirements (e.g., 0.5 and 1 ms). (4) relatively short transmission duration (e.g., 2 OFDM symbols). (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission. (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

FIG. 4 is a block diagram illustrating a configuration of an intelligent device according to an embodiment of the present invention.

Referring to FIG. 4, according to an embodiment of the present invention, an intelligent device includes a controller 101, a power supply unit 110, a control signal receiving unit 120, an image obtaining unit 130, a location recognizing unit 140, a display unit 150, a projector 160, a hardware module 170, and a communication unit 180. The intelligent device 100 may be either a home appliance or an electronic device.

The controller 101 manages the overall operation of the intelligent device 100 including the hardware module 170. In particular, the controller 101 sets a projection mapping area in an area departing from the user's location according to a particular control command and displays status information in the projection mapping area.

The particular control command is a command to perform control to display status information for the intelligent device 100. The status information may include the status in which the intelligent device 100 is currently operated or additional information that the intelligent device 100 provides. For example, when the intelligent device 100 is an air conditioner, the status information may be information for setting the current temperature and direction of the air conditioner or additional information, e.g., current indoor temperature or humidity. The projection mapping area denotes an area to which the projector 160 projects the status information.

The power supply unit 110 may include a battery and a battery driver. The battery may be, e.g., a lithium-ion (Li-Ion) battery, and the battery driver may manage the charging and discharging of the battery.

The control signal receiving unit 120 receives a control command entered by the user via a user interface. The control signal receiving unit 120 may include a voice recognizing unit 121 for receiving voice signals and an infrared radiation (IR) receiving unit 122 for receiving IR signals from an IR receiving remote controller.

The IR receiving unit 122 may include a sensor for receiving signals from an IR remote controller to remotely control a robot vacuum (not shown).

The image obtaining unit 130 may include a two-dimension (2D) camera 131 and a three-dimension (3D) camera 132. The 2D camera 131 may be a sensor for recognizing a human or thing based on a 2D image. The 3D camera 132 may include a red-green-blue (RGB) sensor and a sensor for obtaining depth data.

The location recognizing unit 140 may include a light detection and ranging (lidar) and a simultaneous localization and mapping (SLAM) camera. The SLAM camera may implement simultaneous localization and mapping technology. The lidar, as a laser radar, is a sensor which emits laser beams, collects and analyzes beams reflected by an object, thereby performing location recognition.

The display unit 150 may be intended for displaying, e.g., the operation state of the intelligent device 100 or event circumstances and may include a sound output unit 151 for outputting voice signals and a display 152 for displaying images.

The projector 160 generates an image based on the status information generated by the controller 101 and displays the status information in the mapping area via a lens. The projector may be implemented as, e.g., a cathode-ray tube (CRT projector), a liquid crystal display (LCD) projector, or a digital light processing (DLP) projector.

The hardware module 170 includes components for performing unique functions of the intelligent device 100. For example, when the intelligent device 100 is an air conditioner, the hardware module 170 may include a compressor, a condenser, an expander, and an evaporator.

The communication unit 180 may be configured as a communication module for Wi-Fi, Bluetooth, infrared radiation (IR), ultra-wideband (UWB). Zigbee. or other know short-range wireless communication or as a mobile communication module, such as for 3G 4G LTE, or 5G or the communication unit 180 may alternatively be configured as a known communication port for wired communication.

FIG. 5 is a block diagram illustrating an AI device according to an embodiment of the present invention.

Referring to FIG. 5, an AI device 20 may include an electronic device including an AI module capable of AI processing or a server including an AI module. The AI device 20 may be included as a component of the controller 101 of FIG. 4 so that the AI device 20 may perform at least part of AI processing along with the controller 101.

AI processing may include all operations related to the controller 101 of FIG. 4.

The AI device 20 may be a client device that directly uses the AI processing result or may be a device in a cloud environment that provides the AI processing result to another device. The AI device 20 is a computing device capable of learning neural networks, and may be implemented as various electronic devices such as a server, a desktop PC, a notebook PC, a tablet PC, and the like.

The AI device 20 may include an AI processor 21, a memory 25, and/or a communication unit 27.

The AI processor 21 may learn a neural network based on the program stored in the memory 25. In particular, the AI processor 21 may learn a neural network for recognizing relevant data of the controller 101. The neural network for recognizing the relevant data of the controller 101 may be designed to mimic the human brain on the computer and may include a plurality of weighted network nodes which mimic the neurons of the human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

FIG. 6 is a flowchart illustrating a method of displaying status information according to an embodiment of the present invention.

Referring to FIG. 6, according to an embodiment of the present invention, a method of displaying status information receives a control command in a first step S610.

The control command may be transferred via a remote controller 109 or a voice recognition function as shown in FIG. 7. For example, the control signal receiving unit 120 of the intelligent device 100 may receive the user's speech saying, "Let me know the air conditioner's mode." The control signal receiving unit 120 of the intelligent device 100 may receive an IR signal from the remote controller 109.

In a second step S620, the user's location is determined.

The intelligent device 100 may identify the user's location via the image obtaining unit 130 or the location recognizing unit 140.

For example, to determine the user's location, the location recognizing unit 140 may analyze the waveform radiated from the lidar and reflected by the user.

The controller 101 may determine the user's location based on an ambient image for an ambient area of the intelligent device 100, which is obtained by the image obtaining unit 130. The controller 101 may detect objects from the ambient image and detect a user object corresponding to the user among the objects, thereby determining the user's location.

In a third step S630, the controller 101 sets mapping candidate areas. Other areas than where the user is located may be set as the mapping candidate areas.

In a fourth step S640, the controller 101 selects any one or more of the mapping candidate areas as a mapping area and displays the status information in the mapping area in a projection mapping scheme.

FIG. 8 is a view illustrating a method of obtaining mapping candidate areas. FIG. 8 is a view illustrating the third step S630 of FIG. 6.

Referring to FIG. 8, the intelligent device 100, according to an embodiment of the present invention, obtains an ambient image for an ambient area of the intelligent device 100. The intelligent device 100 represents the plan of the ambient image with coordinates and detects objects from images for the ambient image.

The controller 101 detects the object corresponding to the user USER among the objects. The controller 101 obtains object coordinates corresponding to the user USER from the plan coordinates. The controller 101 may select other areas than a predetermined area including the object coordinates as the mapping candidate areas.

The mapping candidate areas may include wall surfaces, e.g., first to fourth mapping candidate areas MPA1 to MPA4. Alternatively, the mapping candidate areas may be floor surfaces, e.g., fifth and sixth mapping candidate areas MPA5 and MPA6. The floor surfaces may be divided into the fifth mapping candidate area MPA5 on which no object is placed and the sixth mapping candidate area MPA6 which an object, e.g., a couch, is placed.

FIG. 9 is a view illustrating an embodiment of displaying status information in a projection mapping scheme. FIG. 9 illustrates an example in which a mapping area is selected from among mapping candidate areas and status information is displayed in the mapping area.

Referring to FIG. 9, the controller 101 may display status information indicating that the air conditioner is running in a projection mapping scheme. If the hardware module 170 of the intelligent device 100 includes two vents AC1 and AC2, the controller 101 may set two mapping areas M1 and M2 to intuitively display status information for each vent AC1 and AC2. For example, the controller 101 may set a first mapping area M1 for displaying status information for a first vent AC1 and a second mapping area M2 for displaying status information for a second vent AC2.

As such, the intelligent device 100 may set the number and direction of mapping areas to intuitively display status information for the hardware module 170.

FIG. 10 is a view illustrating a method of setting a mapping area according to another embodiment.

Referring to FIG. 10, the controller 101 may detect the user USER's sight and set a mapping area within the user's vision.

When the user USER gazes at the second mapping candidate area MPA2 which corresponds to a wall surface, the controller 101 sets a mapping area M21 within the second mapping candidate area MPA2. To that end, the controller 101 may display the operation state of the intelligent device 100 in one mapping area M21.

The controller 101 may detect the user's face from an image obtained by the image obtaining unit 130 and regard the position of the user's face as the direction of the user's sight. When the image has a high resolution, the controller 101 may detect the position of an iris from the user's face based on an eye-tracking scheme and identify the direction in which the user's gaze is directed based on the position of the iris.

The controller 101 may obtain a wave reflected by the user using the lidar and may analyze the frequency of the reflected wave, thereby figuring out the user's shape and the position of his face.

As such, since the intelligent device 100 sets the mapping area according to the direction of the user USER's gaze, the user USER may easily identify the status information for the intelligent device 100, with no limitations imposed on his action or movement.

FIG. 11 is a view illustrating a method of displaying a projection mapping image according to a user's gaze.

Referring to FIG. 11, the controller 101 may set mapping areas M31, M32, and M33 in the fifth mapping candidate area MPA5 which is the floor surface lower than the user's gaze. The controller 101 may display the status information in any one of the mapping areas M31, M32, and M33 and may rotate the mapping areas M31, M32, and M33 according to the user's gaze direction.

FIG. 12 is a view illustrating a method of setting a mapping area according to still another embodiment.

Referring to FIG. 12, according to an embodiment of the present invention, a method of setting a mapping area selects mapping candidate areas in a first step S1210. Selecting the mapping candidate areas may include the first step S610 through the third step S630 of FIG. 6.

In a second step S1220, images of the mapping candidate areas are obtained. The images of the mapping candidate areas may be obtained by the image obtaining unit 130.

In a third step S1230, the controller 101 may select the mapping candidate area, which corresponds to the image with the smallest gray level distribution among the images of the mapping candidate areas, as a mapping area.

Alternatively, the controller 101 may detect an area with a low gray level from a single mapping candidate area and set the low-gray level area as a mapping area. For example, if the second mapping candidate area MPA2 is an area including a transparent window 203 and a curtain 201 with low brightness as shown in FIG. 13, the respective gray levels of the transparent window 203 and curtain 201 areas in the image of the second mapping candidate area MPA2 may make a significant difference therebetween. If the second mapping candidate area MPA2 is captured in the sunny daytime, the mean gray level of the transparent window 201 is shown high, and the mean gray level of the curtain 201 is shown low.

The controller 101 may detect a low-mean gray level area from the mapping candidate area and set the detected low-mean gray level area as a mapping area M3.

Since the mapping area M3 is an area where projection mapping is performed, the controller 101 may search for low-mean gray level areas in minimum size units in which projection mapping can be possible.

According to another embodiment, after the second step S1220 of FIG. 12, the controller 101 may select the mapping candidate area, which corresponds to the image with the lowest edge detection frequency among the images of the mapping candidate areas, as a mapping area. This may be so done because the low-edge detection frequency means that the background of the image is simple and such low-edge detection frequency image may be more appropriate for the mapping area to display status information.

FIG. 14 is a view illustrating a system of displaying status information for an electronic device according to another embodiment.

Referring to FIG. 14, according to the other embodiment, a system of displaying status information for an electronic device includes an Internet-of-things (IoT) server 201, an IoT hub 200, a capturing device 310, a projector device 320, and electronic devices 331 to 333. In FIG. 14, the IoT hub 200 overall controls the process of displaying status information in a projection fashion. In other words, the IoT hub 200 receives status information for the electronic devices 331 to 333 which correspond to external devices and drives the projector device 320 to display the status information.

The status information displaying system is described below in detail.

The IoT server 201 may connect the IoT hub 200 with the first to third electronic devices 331, 332, and 333 via the Internet. The IoT server 201 may include a cloud server and a database for an IoT system. The IoT server 201 may perform analysis on bigdata based on the database.

The IoT hub 200 controls the capturing device 310, the projector device 320, and the first to third electronic devices 331 to 333. The IoT hub 200 includes a control module 210, a receiving module 220, and a transmitting module 230.

The control module 210 determines the user's location in response to a control command and selects other areas than where the user is located as mapping candidate areas. The control module 210 selects at least any one of the mapping candidate areas as a mapping area. The control module 210 drives the projector device 320 to display status information in the mapping area in a projection fashion.

The receiving module 220 receives control commands for performing control to display the status information for the electronic devices 331 to 333. The receiving module 220 receives an ambient image obtained by capturing devices and receives the status information from the electronic devices 331 to 333.

The transmitting module 230 provides a control signal for driving the projector device 320 to the projector device 320 and transmits request signals for the status information for the electronic devices 331 to 333.

The projector device 320 generates an image based on the status information and displays the status information in the mapping area via. e.g., a lens. The projector device 320 may be implemented as, e.g., a cathode-ray tube (CRT projector), a liquid crystal display (LCD) projector, or a digital light processing (DLP) projector.

The electronic devices 331 to 333 provide the status information to the IoT hub 200 under the control of the IoT hub 200.

FIG. 15 is a view illustrating a method of displaying status information using a system as illustrated in FIG. 14.

Referring to FIG. 15, the IoT hub 200 may display the status information for the electronic devices 331 to 333 using the projector 160 separate from the electronic devices 331 to 333.

In the system shown in FIGS. 14 and 15, the method of displaying status information may adopt the processes shown in FIGS. 6 and 12.

In other words, in the first step S610, the IoT hub 200 may receive the user USER's control command as shown in FIG. 6. For example, the IoT hub 200 may receive a control command to display the operation state of a washer 331.

In the second step S620, the IoT hub 200 may determine the user's location. The IoT hub 200 may obtain an image using the capturing device 310, e.g., a camera or a piece of CCTV equipment, and detect the object corresponding to the user in the image.

In the third step S630, the IoT hub 200 selects projection mapping candidate areas other than the user's location.

In the fourth step S640, the IoT hub 200 selects any one or more among the projection mapping candidate areas as a mapping area(s). In this case, the IoT hub 200 may adopt the embodiment shown in FIG. 12. The IoT hub 200 drives the projector 160 to display the status information for the washer 331 in the mapping area M41 in a projection mapping scheme. To that end, the IoT hub 200 may receive status information from the washer 331 and provide the received status information to the projector 160.

As set forth above, when the status information for the home appliances 331 to 333 is displayed in the projection mapping scheme using the IoT hub 200, the status information for the electronic devices 331 to 333 may be displayed in the projection mapping scheme although the projector 160 is not equipped in the electronic devices 331 to 333.

In the embodiment shown in FIGS. 14 and 15, since the status information is not directly projected from the electronic devices 331 to 333, the status information for the electronic devices may be displayed out of the user's sight.

FIG. 16 is a view illustrating a method of generating user location information and mapping information according to another embodiment of the present invention.

Referring to FIG. 16, a UE may control a communication module to transmit image information to an AI processor included in a 5G network. The UE may correspond to the intelligent device 100 of FIG. 4, and the communication module may correspond to the communication unit 180. Alternatively, the UE may be the IoT hub 200 of FIG. 14, and the communication module may be an electronic device which corresponds to an image obtaining device.

The UE may control the communication module to receive AI-processed information from the AI processor. The AI-processed information may be user location information or mapping information.

The UE may transmit image information obtained by the image obtaining unit to the network based on DCI (S1600). The image information may be transmitted to the 5G network via a physical uplink shared channel (PUSCH), and the DM-RSs of the synchronization signal block (SSB) and PUSCH may be quasi co-located (QCL) for QCL type D.

The 5G network may include an AI processor or an AI system, and the AI system of the 5G network may perform AI processing based on the received information.

The AI system may analyze the image information received from the UE. The AI system analyzes the image information (S1610). The AI system generates user location information or mapping information based on a result of analysis of the image information (S1620).

The 5G network may transmit the user location information or mapping information obtained by the AI system to the UE (S1630).

The above-described invention may be implemented in computer-readable code in program-recorded media. The computer-readable media include all types of recording devices storing data readable by a computer system. Example computer-readable media may include hard disk drives (HDDs), solid state disks (SSDs), silicon disk drives (SDDs), ROMs. RAMs, CD-ROMs, magnetic tapes, floppy disks, and/or optical data storage, and may be implemented in carrier waveforms (e.g., transmissions over the Internet).

The foregoing detailed description should not be interpreted not as limiting but as exemplary in all aspects. The scope of the present invention should be defined by reasonable interpretation of the appended claims and all equivalents and changes thereto should fall within the scope of the invention.

The foregoing features, structures, or effects are included in, but not limited to, at least one embodiment of the present invention. The features, structures, or effects exemplified in each embodiment may be combined or modified by one of ordinary skill in the art in other embodiments. Thus, such combinations or modifications should be interpreted as belonging to the scope of the present invention.

While the present invention has been shown and described with reference to exemplary embodiments thereof, it will be apparent to those of ordinary skill in the art that various changes in form and detail may be made thereto without departing from the spirit and scope of the present invention as defined by the following claims. For example, each component in the embodiments may be modified. Such modifications and applications should be construed as included in the scope of the present invention as defined by the appended claims.

What is claimed is:

1. A method of displaying status information for a device to a user, the method comprising:
   receiving a control command for controlling the device to display the status information;
   determining the user's location;
   selecting other areas than where the user is located as mapping candidate areas; and
   selecting at least any one or more of the mapping candidate areas as a mapping area and displaying the status information in the mapping area in a projection fashion,
   wherein selecting the mapping area includes:
      obtaining images of the mapping candidate areas; and
      selecting the mapping area from among the mapping candidate areas based on a gray level distribution of the images of the mapping candidate areas.

2. The method of claim 1, wherein determining the user's location includes analyzing a waveform radiated from a lidar and reflected by the user.

3. The method of claim 1, wherein determining the user's location includes:
   obtaining an image for an ambient area of the device;
   performing artificial intelligence (AI) learning by analyzing the image;
   detecting objects based on the AI learning; and
   detecting a user object corresponding to the user from the objects.

4. The method of claim 3, wherein selecting the mapping area includes:
   identifying an area, to which the user's gaze is directed, from the image; and
   setting the area, to which the user's gaze is directed, as the mapping area.

5. The method of claim 4, wherein identifying the area to which the user's gaze is directed includes performing eye-tracking in the image.

6. The method of claim 5, wherein when a floor surface which is lower than the user's gaze is selected as the mapping area, displaying the status information includes rotating the mapping area according to the user's gaze direction.

7. The method of claim 3, wherein determining the user's location or selecting the mapping area further includes receiving, from a network, downlink control information (DCI) used for scheduling transmission of information for image for an ambient area of the device, and wherein the information for image for an ambient area of the device is transmitted to the network based on the DCI.

8. The method of claim 7, wherein determining the user's location or selecting the mapping area further includes performing an initial access procedure with the network based on a synchronization signal block (SSB), wherein the information for image for an ambient area of the device is transmitted to the network via a physical uplink shared channel (PUSCH), and wherein demodulation-reference signals (DM-RSs) of the SSB and the PUSCH are quasi co-located (QCL) for QCL type D.

9. The method of claim 1, wherein selecting the mapping area includes selecting a mapping candidate area, which corresponds to an image with a lowest mean gray level among the images of the mapping candidate areas, as the mapping area.

10. The method of claim 1, wherein selecting the mapping area includes selecting a mapping candidate area, which corresponds to an image with a lowest edge detection frequency among the images of the mapping candidate areas, as the mapping area.

11. An intelligent device, comprising:
    a control signal receiver receiving a control command for controlling a device to display status information;
    a camera obtaining an ambient image of the device; and
    a processor determining a user's location in response to the control command, selecting areas other than where the user is located as mapping candidate areas, selecting at least one of the mapping candidate areas as a mapping area, and controlling the device to display the status information in the mapping area in a projection fashion,
    wherein the processor obtains images of the mapping candidate areas and selects a mapping area from among the mapping candidate areas based on a gray level distribution of the images of the mapping candidate areas.

12. The intelligent device of claim 11, wherein the processor determines the user's location by detecting objects from the ambient image and detecting an object corresponding to the user among the objects.

13. The intelligent device of claim 11, wherein the processor identifies an area to which the user's gaze is directed in the ambient image and sets the area, to which the user's gaze is directed, as the mapping area.

14. The intelligent device of claim 13, wherein the processor rotates the mapping area according to the user's gaze direction when a floor surface, which is lower than the user's gaze, is selected as the mapping area.

15. An intelligent device controlling a projector device to display status information for an external device, the intelligent device comprising:
    a receiver receiving a control command for controlling the intelligent device to display the status information for the external device, receiving an ambient image obtained by at least one capturing device, and receiving the status information from the external device;
    a processor generating a control signal for determining a user's location in response to the control command, selecting areas other than where the user is located as mapping candidate areas, selecting at least one of the mapping candidate areas as a mapping area, and controlling the projector device to display the status information in the mapping area in a projection fashion; and
    a transmitter transmitting the control signal to the projector device, wherein the processor obtains images of the mapping candidate areas and selects a mapping area from among the mapping candidate areas based on a gray level distribution of the images of the mapping candidate areas.

16. The intelligent device of claim 15, wherein the processor determines the user's location by detecting objects from the ambient image and detecting an object corresponding to the user among the objects.

17. The intelligent device of claim 15, wherein processor identifies an area to which the user's gaze is directed in the ambient image and sets the area, to which the user's gaze is directed, as the mapping area.

18. The intelligent device of claim 17, wherein the processor rotates the mapping area according to the user's gaze direction when a floor surface, which is lower than the user's gaze, is selected as the mapping area.

* * * * *